(12) United States Patent
Guilley et al.

(10) Patent No.: US 9,950,808 B2
(45) Date of Patent: Apr. 24, 2018

(54) METHOD AND DEVICE FOR CONFIGURING AN ALERTS MANAGEMENT SYSTEM FOR AN AIRCRAFT

(71) Applicant: THALES, Neuilly-sur-Seine (FR)

(72) Inventors: Fabien Guilley, Merenvielle (FR); Chris Deseure, Toulouse (FR); Gilles Francois, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 13/869,717

(22) Filed: Apr. 24, 2013

(65) Prior Publication Data

US 2013/0282206 A1   Oct. 24, 2013

(30) Foreign Application Priority Data

Apr. 24, 2012 (FR) ...................... 12 01198

(51) Int. Cl.
*B64D 45/00* (2006.01)
*G06Q 10/06* (2012.01)

(52) U.S. Cl.
CPC ............. *B64D 45/00* (2013.01); *G06Q 10/06* (2013.01); *G06F 2209/543* (2013.01)

(58) Field of Classification Search
CPC ... G05B 23/00–23/0297; G08G 5/0021; B64C 19/00

USPC ............................................................. 701/3
See application file for complete search history.

(56) References Cited

U.S. PATENT DOCUMENTS

| 6,127,944 | A | 10/2000 | Daly et al. |
| 2011/0063136 | A1 | 3/2011 | Fabas et al. |
| 2011/0160936 | A1* | 6/2011 | Campagne et al. ............. 701/3 |
| 2012/0004794 | A1* | 1/2012 | Guilley et al. .................. 701/14 |

FOREIGN PATENT DOCUMENTS

| FR | 2950176 A1 | 3/2011 |
| FR | 2950184 A1 | 3/2011 |
| FR | 2954842 A1 | 7/2011 |

* cited by examiner

*Primary Examiner* — Courtney D Heinle
(74) *Attorney, Agent, or Firm* — Baker & Hostetler LLP

(57) ABSTRACT

A method and a device for configuring an alerts management system for an aircraft comprises: generating a list of a plurality of alerts and of resolution procedures for an aircraft; for each alert, defining: distinctive characteristics of the alert; logic for detecting the alert; at least one procedure for resolving the alert; and, for each alert, defining recording in a dedicated alerts file the set of information defined for said alert, the alerts file having a structure and a format of data that are predefined for the alerts and the procedures; determining existing links between the dedicated alerts files; and in response to the determining step, updating the content of the dedicated alerts files according to the links identified.

17 Claims, 3 Drawing Sheets

METHOD AND DEVICE FOR CONFIGURING AN ALERTS MANAGEMENT SYSTEM FOR AN AIRCRAFT

CROSS-REFERENCE TO RELATED APPLICATION

This application claims priority to foreign French patent application No. FR 1201198, filed on Apr. 24, 2012, the disclosure of which is incorporated by reference in its entirety.

FIELD OF THE INVENTION

The invention relates to the field of alerts management systems on aircraft, and more particularly a method and a device for configuring such a system.

BACKGROUND

The alert system of an aircraft or "Flight Warning System" (FWS) is a system at the core of the aircraft. It generally comprises a system for managing procedures and an alarms facility.

It indicates to the pilot the procedures to be followed for managing the airplane, be it in nominal mode or in degraded mode. Quantitatively, an FWS manages of the order of 5000 signals, 1000 alerts and 1000 procedures.

This alert system is connected to most of the airplane's electronic equipment, such as for example to the fuel management system, to the electrical or hydraulic system, to mention just a few.

The various electronic systems evolve in the course of the development of the airplane, be it in their interface or in the dynamic behaviors of the signals generated, so that the fine tuning of an FWS is done throughout the development cycle and up to the last flights preceding the certification flights.

Thus, the FWS alert system is, through its central position, modified and updated continually during the development of the airplane but essentially in the home straight just before certification.

Hence the design of an FWS may not leave room for inaccuracies and gaps. And an airplane rigger must ensure that all the alert requirements have been captured as a function of the feared events and of the operations of the airplane's various sub-systems.

The capture of the alert requirement is commonly carried out in a documentary manner solely by using documentary models which list predefined situations. Moreover, verification of the completeness of this requirement is done through a process of documentary review.

Thus, the expression of the alert requirement has to date been done in natural language and its accuracy remains interpretable. This may give rise to inaccuracies and technical incompatibilities.

The requirement thus exists for a solution which makes it possible to group the alert requirements together in a complete manner and makes it possible to circumvent errors of interpretation.

SUMMARY OF THE INVENTION

The present invention addresses this requirement.

An object of the present invention is to offer a system and a scheme for defining the characteristics of an FWS in an iterative and complete manner.

Another object of the present invention is to provide a system tailored to the user, be it an airplane rigger or airline.

Advantageously, the present invention offers an interface for inputting the characteristics of an FWS which is specific to the environment of the aircraft to be characterized.

Advantageously, the present invention applies in a dynamic manner to any new FWS environment or any new alert requirement to be defined.

Advantageously, the present invention allows pre-validation of the editing of the characteristics of the FWS.

A further object of the present invention is to offer a device allowing iterative development 'horizontally' on all the alerts and then on all the alert procedures or 'vertically' on each alert and its associated procedures.

Advantageously, the present invention will be implemented in the context of the aeronautical industry.

To obtain the sought-after results, a method and a device are proposed.

In particular, a method executed on a computer for configuring an alerts management system for an aircraft comprises the steps of:
- generating a list comprising a plurality of alerts and of resolution procedures for an aircraft;
- for each alert:
  - defining:
    - distinctive characteristics of the alert;
    - logic for detecting the alert;
    - at least one procedure for resolving the alert; and
  - a recording in a dedicated alerts file the set of information defined for said alert, the alerts file having a structure and a format of data that are predefined for the alerts and the procedures;
- determining existing links between the dedicated alerts files; and
- in response to the determining step, updating the content of the dedicated alerts files according to the links identified.

Various implementation variants are described.

BRIEF DESCRIPTION OF THE DRAWINGS

Various aspects and advantages of the invention will appear, supported by the description of a preferred but nonlimiting mode of implementation of the invention, with reference to the figures hereinbelow.

DETAILED DESCRIPTION

Figure 1:
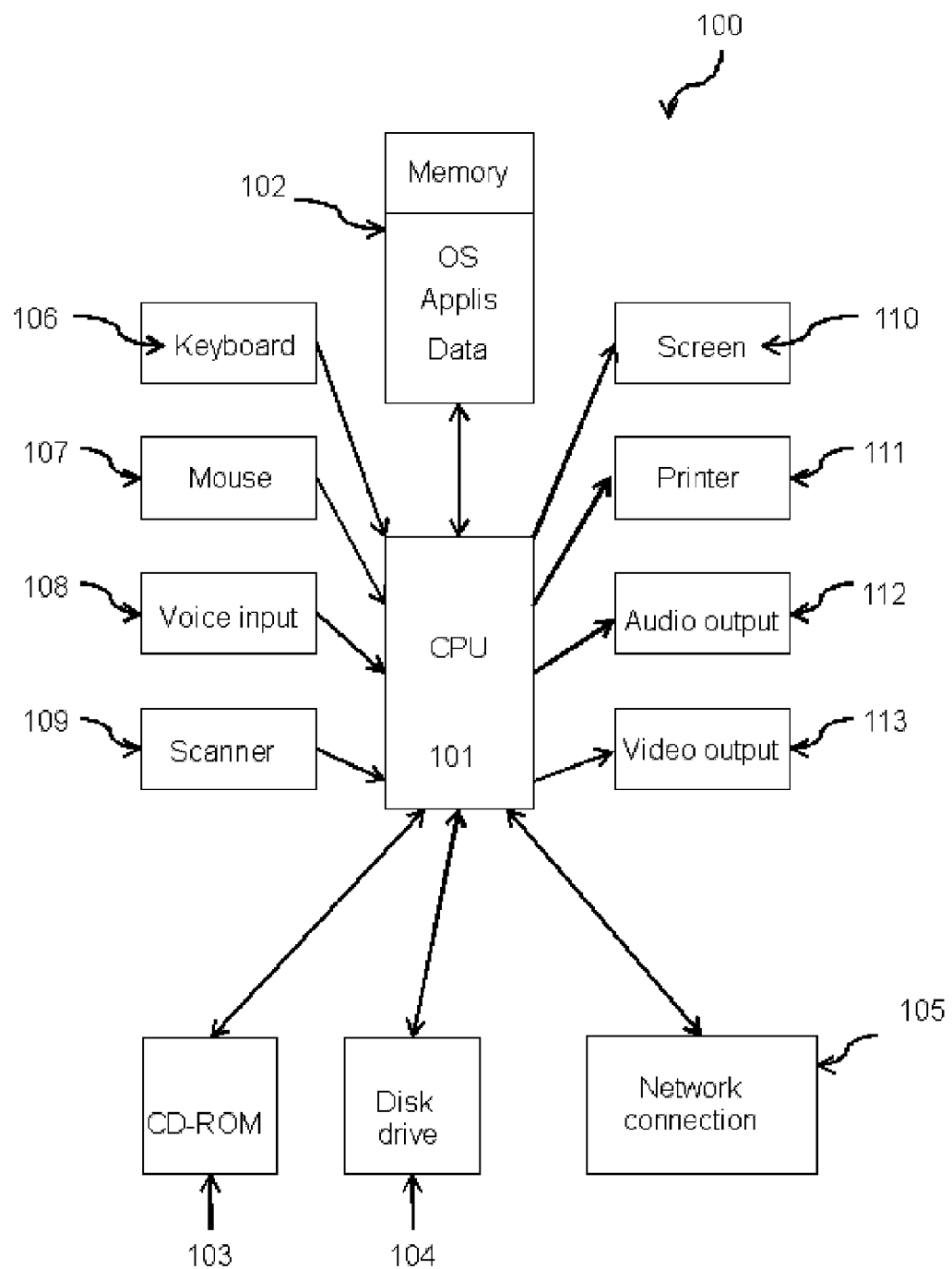
FIG. 1 is a diagram of a system for configuring an FWS according to the principles of the invention.

FIG. 1 illustrates a computer system (100) making it possible to implement the device and to operate the method of the invention so as to configure an alerts management system or FWS.

The system 100 is composed of a central processing unit 101 with a storage memory (RAM and ROM) 102. The memory 102 stores computer programs relating to the operating system and to specific applications running on the computer system 100, as well as data of the system. Additional storage units can include optical disks 103 and magnetic disks 104. However, the data and the programs can also be stored and accessible on the additional units.

The central processing unit 101 comprises means for entering data, such as for example an input keyboard 106, a mouse 107, a microphone 108 for entering sound, voice, and also a scanner 109 for entering text, images or graphics. The central processing unit 101 also comprises means for producing data, such as for example visual display means 110, a printer 111, a sound output 112, a video output 113, or other.

Figure 2:
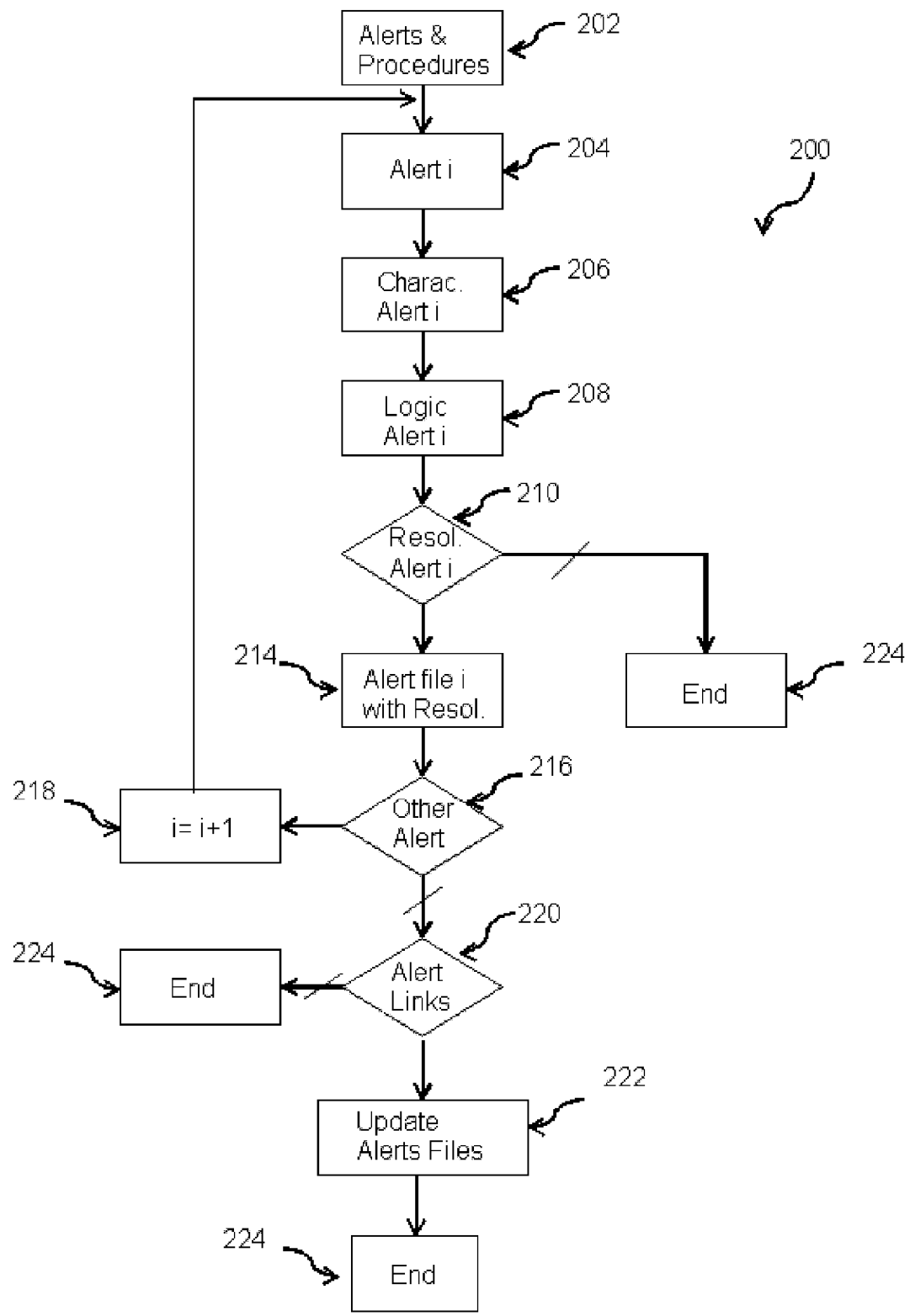
FIG. 2 shows the steps operated by the scheme of the invention for configuring an FWS for alerts associated with procedures.

FIG. 2 shows steps 200 operated in a variant implementation of the scheme of the invention.

In a first step 202, a list of alerts and procedures is generated. This list may be new and created in full or arise from an existing one or else be an extension of a previously created list of alerts. Known alerts pertain for example to poor configuration of the airplane on takeoff, such as an incorrect position of the flaps, an imminent-stall alert or else an automatic pilot disconnection alert.

Existing alerts and procedures may arise from previous records of these data.

The records may be stored locally on a system such as that of FIG. 1 where the scheme can operate or be transferred from a remote database.

The alerts are defined as a function of various criteria well known to the person skilled in the art. In particular, the alerts are dependent on the structural and functional architecture of the craft considered. They also depend on the known "Preliminary Functional Hazard Analysis" (PFHA) procedure which takes into account feared events, such as for example the loss of an engine, of a wing, or the outbreak of a fire. The alerts are also dependent on the conduct of the craft considered. Moreover, certain alerts are imposed by regulation.

In step 204, the method fixes a variable (i) to select first alert. In the following step 206, the characteristics of the alert are defined.

For each characteristic, a value is allocated. The value of a characteristic is chosen either from a list of constrained values, or assigned by certain of the attributes of the characteristic, such as for example the zone of variability for a real value or the length of the text for a character string.

The characteristics defined in step 206 are detailed below with reference to the table 4a and comprise for example, the message of the alert such as it will be broadcast to its recipient, the means for attracting the recipient's attention or "Attention Getter", or else the priority level of the alert.

The following step 208 consists in defining the logic for detecting the alert selected to trigger the alert and halt it. This step is essential and must be assured of the consistency of all the alert detections implemented for the system. This step is based on the behavior of the monitored system, that is to say its operating state. The operating state of the system may be nominal (no alert), in a special mode of configuration (alert of MEMO type for a non-conventional but possible state for the monitored system), in a degraded state (such as the case of systems operating on 2 channels upon the loss of one of the 2 channels), in a fault state, or else in an off state.

In the following step 210, the method verifies whether there exists at least one resolution procedure associated with the alert.

If no resolution procedure exists, the method stops (224). There is no procedure when a simple piece of information is involved, such as an indication of "Takeoff lights on" or "Belts fastened" for example.

If at least one resolution procedure exists, the method passes to step 214 where an "alert with procedure" file is created.

The procedure for resolving an alert takes into account the set of events allowing the choice of the best procedure as a function of the context in which the fault triggering the alert occurs. This essential step is based on the analysis of the behavior of the monitored system and its intereaction with the remainder of the airplane.

In step 216, the method verifies whether all the alerts of the list have been defined. If alerts remain to be characterized, the method increments (218) the variable (i) and loops back to step 204 on a new alert to define its characteristics (206), the detection logic (208) and the optional associated resolution procedure or procedures (210).

When all the alerts have been defined, the method passes to step 220.

Step 220 consists in ensuring the global consistency of the monitored system over all the alerts defined at the airplane level as a whole. The method verifies the links which exist between the set of the alerts characterized as a function of the faults and of the hierarchy of the faults. This may be a matter for example of the disabling of alerts by primary alerts, or of links between the procedures, such as the acknowledgment of one procedure by another.

When links between alerts are detected, the method passes to step 222 where the alert files involved are updated. When all the links have been established, the method stops (END).

Figure 3:
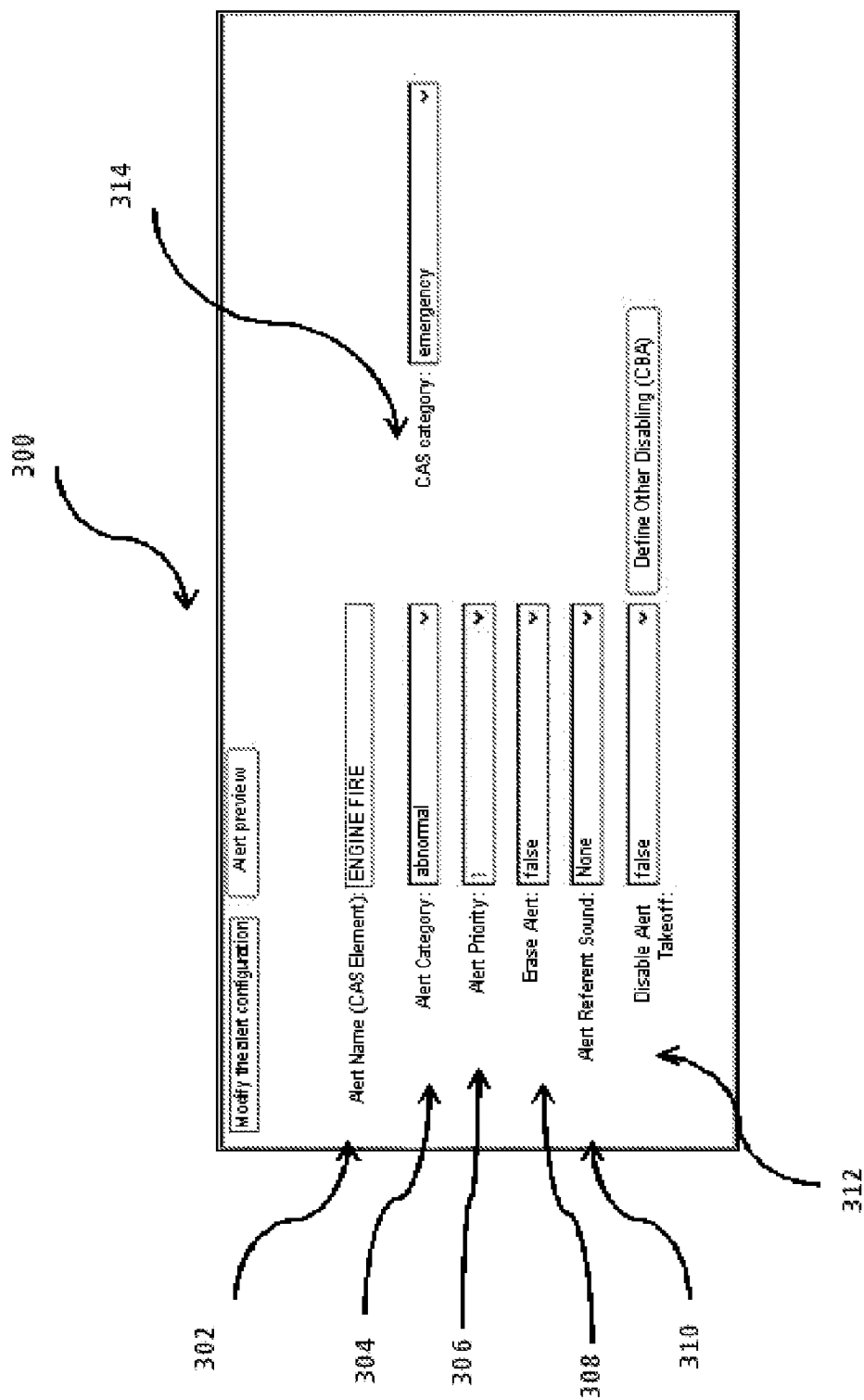
FIG. 3 illustrates a graphical user interface for inputting alert characteristics in a preferential implementation of the invention.

FIG. 3 illustrates a graphical user interface 300 for inputting alert characteristics in a preferential implementation of the invention.

The interface advantageously comprises various fields for inputting the characteristics associated with an alert.

An 'Alert Name' field 302 makes it possible to designate the alert, such as for example 'ENGINE FIRE' to indicate an engine fire, or else 'Flaps asymmetric', 'Smoke', 'Fuel level low', 'Fault with the hydraulic pump of the 'blue' circuit', 'Fault with the probes de-icing system' to give just a few examples.

An 'Alert Category' field 304 makes it possible to select the category of the alert as normal, abnormal, urgent, advisory, state alert or other category.

An 'Alert Priority' field 306 makes it possible to input the priority level of the alert within its category.

An 'Alert Erase' field 308 makes it possible to erase the alert from the screen through an action by the pilot.

An 'Alert Referent Sound' field 310 makes it possible to select whether a sound, and which one, is to be associated with the alert. Advantageously drop-down menus may propose sounds.

A 'Takeoff Alert Disable' field 312 makes it possible to define the flight phases in which the alert is disabled on takeoff.

The man-machine interface (MMI) described is an example in an advantageous variant implementation of the invention, but is in no way limiting and the person skilled in the art will be able to apply the principles of the invention to other interfaces exhibiting different and/or additional input fields and organized according to a different presentation.

As described previously, the list of alerts can either be created and all the characteristics input by the user(s). Alternatively, alerts can be pre-existing and recalled together with their characteristics which can be updated from the input interface.

Merely for the understanding of the invention and for simplification, tables 4 to 6 annexed are now described in an exemplary alert in the case of difference of altitude provided by the air data calculators, the air data calculators generally being two in number. The structures described with reference to tables 4 to 6 are merely illustrative, and any variant implementation may be applied according to the same principles of the invention.

Tables 4a and 4b illustrate the content of a file for defining the characteristics of alerts in a preferential implementation of the invention. Tables 5a to 5f illustrate the content of a file for defining the procedures for resolving alerts in a preferential implementation of the invention. The table 6 illustrates the content of a file for defining the various logic for detecting alerts in a preferential implementation of the invention.

Advantageously, the structure of the dedicated alert file is in the form of a table 4a comprising a set of columns (4002, 4004, 4006, 4008, 4010) defining respectively the 'Context' (4002), the 'Data' (4004), the 'Description' (4006), the 'Cardinality' (4008) and the 'Range' (4010). The table for defining an alert comprises a set of entries (402 to 430) which will be fixed according to the alert and characterized for each of the elements of the columns 4002 to 4010.

This type of alert will be defined as follows:
Name of the alert (414)=Altitude Air Mismatch
Alert type (412)=Attention
Priority level (410)=3
Visual element to be generated (406)=Major Attention
Audio element to be generated (416)=Single chime
Disabling of this alert (424)=Flight phase 1 to 4.

The table 4b illustrates the content of a file for customizing certain parameters according to the type of alert.

Advantageously, the structure of the customized file is in the form of a table comprising a set of columns (4012, 4014, 4016) defining respectively the 'Sound Data' (4012), the 'Description' (4014) and the 'Range' (4016). The customized table of an alert comprises a set of entries (450 to 462) which will be fixed in order to customize the alert. Thus, in the example described, the definition of the sound for attracting attention in the case of an alert of 'Attention' type is fixed at "Single chime" (450). The corresponding sound is based on a 'DO' note (452) which lasts 300 ms (samples referenced by 462). The sound is separated from another sound by 200 ms. The volume is half what is possible (454), knowing that it must remain audible in all the sound configurations of the aircraft. The sound is not repeated (456 and 458), and the sound must be played in its entirety in order to be recognized by the crew (460).

The reference to the detection logic associated with this alert is indicated by a reserved entry in row 404. The definition of the detection logic is illustrated in FIG. 6 for the example given by:
"the filtered altitude difference between the 2 sources must be greater than 150 feet, and confirmed for 3 seconds".

The altitude of source 1 "HP_ADC1" (602) is on the label "206" (608) of the "A429" bus (604) "ADC1_HS_out1" (606). The altitude of source 2 is on the label 206 of the A429 bus ADC2_HS_out5.

This logic is advantageously conveyed by an expression in reverse Polish notation as follows:

The following operators are usable for the definition of the various logic:
AND (logical and)
OR (logical or)
NOT (logical not)
CONF (confirmation on falling or rising edge)
PULSE (generation of a signal equal to 1 during a cycle on falling or rising edge)
MRTRIG (generation of a signal equal to 1 for a the time specified at each edge (falling or rising))
IF THEN ELSE (if the condition is true then the value returned is the first otherwise it is the second)
MULTIPLEXER (ditto hereinabove with an n arguments)
EQ (equality)
NEQ (inequality)
SUP (strict greater than)
INF (strict less than)
DELAY (delays the signal by the specified time)
HOLD (generation of a signal equal to 1 during a the time specified at the first edge (falling or rising))
SUM (sum)
DIF (difference)
MUL (multiplication)
DIV (division)
ABS (absolute value)
trigonometry (COS, SIN, ATAN)
MIN (minimum)
MAX (maximum)
EXP (exponential)
NL (Napierian logarithm)
LPF (low-pass filter)
HPF (High-Pass Filter)
ROUNDED (rounded to the specified decimal)
SR (Square Root).

The definition of the whole of the procedure for resolving the alert is illustrated by the structures of tables 5a to 5f. In the example used, the resolution procedure is defined by:
Definition of the procedure (520)=P_01024
Definition of the type of the procedure (522)=ABNORMAL
Definition of the title of the procedure (524)=ALTITUDE MISMATCH BETWEEN ADC1 AND ADC2

This procedure has a different content if the aircraft is in flight or on the ground. Thus the definition of the content of the procedure (526) varies according to the context, flight or ground.

Moreover, the definition of the ground procedure (540) has different variants as a function of the static configuration of the aircraft (542). For example, the definition of the variant of the ground procedure with an uninstalled ADC3 (544) has a sub-title 'ON THE GROUND' (546) and contains a single page (548). The page (550) is defined by an ordered list of items (552). An item (554) is defined by its "action" type which asks the crew to carry out an action. Once the action has been done, the FWS acknowledges the item as a function of the associated logic (556). The item is defined by an "ADC1" request (558) which asks the crew to do the associated action "SET TO OFF" (560). For this action, the cockpit may be asked for a particular configuration such as for example to present a system page (562).

| HP_ADC2 | 400 | FPB | HP_ADC1 | 400 | FPB | DIFF | ABS | 150 | SUP | rising | 3000 | CONF |

If the item corresponds to the end of a procedure, the procedure or the procedures called are then defined (528) once this procedure has terminated. In the example given, this entails the "air probes de-icing procedure" which is labeled "P_01254".

Thereafter, once this procedure has terminated, this procedure or the procedures deleted from the list are defined (530). In the example given, this entails the "loss of the automatic cabin pressurization system" which is labeled by "P_01080".

Thus the present description illustrates a preferential implementation of the invention, but is not limiting. An example has been chosen so as to allow a good understanding of the principles of the invention, and a concrete application, but it is in no way exhaustive and must allow the person skilled in the art to effect modifications and variants of implementation while retaining the same principles.

The present invention can be implemented on the basis of hardware and/or software elements. It can be available as a computer program product on a computer readable medium. The medium can be electronic, magnetic, optical, electromagnetic or be a broadcasting medium of infrared type. Such media are for example, semi-conductor memories (Random Access Memory RAM, Read-Only Memory ROM), tapes, magnetic or optical diskettes or disks (Compact Disk—Read Only Memory (CD-ROM), Compact Disk—Read/Write (CD-R/W) and DVD).

The invention claimed is:

1. A method executed on an alert management system configuration computer for configuring a flight warning system for an aircraft, comprising the steps of:
    generating a list comprising a plurality of alerts and of resolution procedures for a design and configuration phase of the flight warning system of an aircraft with the alert management system configuration computer;
    for each alert:
        defining:
            distinctive characteristics of the alert, comprising at least a priority level or alert disablers;
            logic for detecting the alert, wherein the logic defines at least one trigger for the alert; and
            at least one procedure for resolving the alert;
        creating a dedicated alert file for recording the set of information defined for said alert in a predefined structure and data format for storing in a memory of the alert management system configuration computer;
    determining with the alert management system configuration computer if links exist between several alerts;
    in response to the determining step, updating with the alert management system configuration computer a content of the dedicated alert file to redefine a logic expression of a detection corresponding to the links identified with the alert management system configuration computer; and
    configuring the flight warning system with the updated dedicated alert file from the alert management system configuration computer,
    wherein the alert management system configuration computer is configured for the interactive development of the dedicated alert file; and
    wherein the flight warning system is configured to operate on board an aircraft utilizing the dedicated alert file.

2. The method as claimed in claim 1, in which the step of defining the distinctive characteristics of the alert consists in defining an alert message or an attention means.

3. The method as claimed in claim 1, in which the step of defining logic for detecting the alert consists in defining the logic based on boolean operators and mathematical operators.

4. The method as claimed in claim 1, in which the step of defining at least one procedure for resolving the alert comprises a step of determining items and actions for configuring the aircraft.

5. The method as claimed in claim 1, in which the step of recording in a dedicated alerts file comprises a step of storing the dedicated alert file in a database of alerts.

6. A configuration device for configuring a flight warning system for an aircraft, comprising:
    a generation module for generating a list of alerts and resolution procedures for a design and configuration phase of the flight warning system of an aircraft with an alert management system configuration computer;
    a computer-input user interface connected to the alert management system configuration computer, the computer input user interface configured, for each alert, to define a set of information comprising:
        distinctive characteristics of the alert, comprising at least a priority level or alert disablers;
        logic for detecting the alert, wherein the logic defines at least one trigger for the alert; and
        at least one procedure for resolving the alert;
    a storage module for the alert management system configuration computer configured to create and store in a dedicated alert file the set of information defined for each alert in a predefined structure and data format for storing in the storage module of the alert management system configuration computer;
    a determination module for the alert management system configuration computer configured to determine if links exist between the several alerts;
    an update module coupled to the determination module and to the storage module configured to update a content of the dedicated alert file to redefine a logic expression of a detection corresponding to the links identified with the alert management system configuration computer; and
    the alert management system configuration computer further configured to configure the flight warning system of the aircraft with the updated dedicated alert file,
    wherein the alert management system configuration computer is configured for the interactive development of the dedicated alert file; and
    wherein the flight warning system is configured to operate on board an aircraft utilizing the dedicated alert file.

7. A configuration device as claimed in claim 6, in which the user interface comprises predefined input fields to allow input of the characteristics associated with an alert.

8. A flight warning system for an aircraft configured to be coupled operatively with a configuration device as claimed in claim 6 so as to configure said flight warning system.

9. A computer program product, said computer program comprising code instructions making it possible to perform the steps of the method as claimed in claim 1, when said program is executed on a computer.

10. A computer program product, said computer program comprising code instructions making it possible to perform the steps of the method as claimed in claim 2, when said program is executed on a computer.

11. A computer program product, said computer program comprising code instructions making it possible to perform the steps of the method as claimed in claim 3, when said program is executed on a computer.

12. A computer program product, said computer program comprising code instructions making it possible to perform the steps of the method as claimed in claim 4, when said program is executed on a computer.

13. A computer program product, said computer program comprising code instructions making it possible to perform the steps of the method as claimed in claim 5, when said program is executed on a computer.

14. A device for configuring a flight warning system for an aircraft, comprising:
- a module for generating a list of alerts and resolution procedures for a design and configuration phase of the flight warning system of an aircraft with an alert management system configuration computer;
- a computer-input user interface connected to the alert management system configuration computer, the computer input user interface configured, for each alert for the flight warning system of the aircraft, to define:
  - distinctive characteristics of the alert for the flight warning system of the aircraft, comprising at least a priority level or alert disablers;
  - logic for detecting the alert for the flight warning system of the aircraft, wherein the logic defines at least one trigger for the alert; and
  - at least one procedure for resolving the alert for the flight warning system of the aircraft;
- a storage module for the alert management system configuration computer to create and store in a dedicated alert file the set of information input for each alert in a predefined structure and data format for storing in the storage module of the alert management system configuration computer for the flight warning system of the aircraft;
- a module for determining if links exist between several alerts;
- a module coupled to the determination module and to the storage module for automatically updating a content of the dedicated alert file for the flight warning system of the aircraft to redefine a logic expression of a detection corresponding to the links identified with the alert management system configuration computer; and
- the alert management system configuration computer further configured to configure the flight warning system of the aircraft with the updated dedicated alert file,
- wherein the alert management system configuration computer is configured for the interactive development of the dedicated alert file; and
- wherein the flight warning system is configured to operate on board an aircraft utilizing the dedicated alert file.

15. The method as claimed in claim 1, wherein configuring the flight warning system with the dedicated alerts file from the alert management system configuration computer further comprises transferring the dedicated alerts file to the flight warning system; and managing procedures and alarms with the flight warning system based on the dedicated alerts file.

16. The configuration device as claimed in claim 6, wherein the flight warning system is configured to manage procedures and alarms based on the dedicated alerts file.

17. The device as claimed in claim 14, wherein the flight warning system is configured to manage procedures and alarms based on the dedicated alerts file.

* * * * *